United States Patent Office 2,922,807
Patented Jan. 26, 1960

2,922,807

PREPARATION OF ACRYLOXYALKYL-ORGANODISILOXANES

Robert L. Merker, Pittsburgh, Pa., assignor to Dow Corning Corporation, Midland, Mich., a corporation of Michigan No Drawing. Application February 1, 1957
Serial No. 637,623

7 Claims. (Cl. 260—448.2)

This invention relates to disiloxanes having acryloxy or methacryloxy groups attached to the silicon through a divalent alkylene radical of from 2 to 4 inclusive carbon atoms.

Conventional organosiloxane resins and rubbers generally consist of polymeric units of the formula $$R''_x SiO_{\frac{4-x}{2}}$$

where $x$ has an average value of from about 0.8 to about 2 and $R''$ represents monovalent hydrocarbon radicals or halogenated derivatives thereof. Such polymers have become well known articles of commerce. One of the difficulties with these polymers has been the high temperature and long heating schedule necessary to cure them to a satisfactory degree. Another difficulty has been due to the fact that ordinarily an organic solvent solution of the resinous polymers must be employed to handle them in the intermediate stage of polymerization in which they are marketed. Many efforts have been made to modify these "silicones" so that solventless thermosetting resins could be produced.

One of the primary objects of this invention is to provide a modified siloxane which can be set at low temperatures in a short period of time, and which can be employed in the fabrication of elastomers or in solventless form as dipping varnishes, impregnating resins, and the like. Other objects will be apparent from the following specification.

This invention specifically relates to disiloxanes of the formula

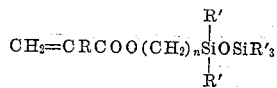

in which $n$ is an integer of from 2 to 4 inclusive, R is selected from the group consisting of hydrogen and methyl radicals, and R' is a monovalent hydrocarbon radical free of aliphatic unsaturation. The R' radicals can be the same or different radicals.

It has been shown in my copending application Ser. No. 431,295, filed May 20, 1954, now U.S. Patent No. 2,793,223, issued May 21, 1957, that siloxanes containing units of the formula

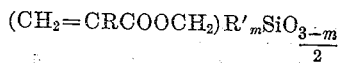

where R and R' are as above defined and $m$ is 1 or 2, can be prepared by reacting, e.g., compounds of the formula

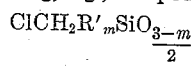

with sodium or potassium salts of acrylic or methacrylic acid. Although such siloxanes have very desirable properties, their commercial development has been somewhat curtailed by the difficulties inherent in the commercial production of the necessary halomethylsiloxane intermediates. The latter are prepared by the halogenation of the methyl radical attached to silicon, and there is a strong tendency in such a reaction toward polyhalogenation. The economical preparation of the corresponding monohaloethyl, monohalopropyl, etc. derivatives is even more difficult.

The compounds of this invention can be prepared by contacting a disiloxane dialcohol of the formula $$O[SiR'_2(CH_2)_nOH]_2$$

with acrylic or methacrylic acid (or a mixture of both acids if a mixed product is desired), followed by equilibrating the reaction product with $(R'_3Si)_2O$, preferably in the presence of an acid catalyst. The first step in this process might be expected to produce the compound $O[SiR'_2(CH_2)_nOOCRC=CH_2]_2$. The latter should be a distillable compound, and thus readily isolated. Actually, however, it has been found that no distillable product is formed from the step in question, and a higher molecular weight polymer of unknown configuration is apparently the only product of this first step.

The second step can be carried out by merely contacting the first reaction product with the hexaorganodisiloxane at room temperature in the present of a suitable acidic organosiloxane rearrangement catalyst, a number of which are well known to the art. A preferred catalyst is concentrated sulfuric acid, and exceedingly good results are obtained by using this in conjunction with trifluoroacetic acid. Amounts of catalyst in the range of about 1 to 5 percent by weight of total acid based on the total siloxanes present are suitable, although this range is by no means critical. The equilibration can be speeded up by carrying it out at elevated temperatures, e.g. up to about 150° C., and less catalyst is required at such temperatures.

If desired, the first and second steps above can be carried out simultaneously. Thus the dialcohol, the acrylic or methacrylic acid, the hexaorganodisiloxane, and the acid catalyst can all be mixed together and allowed to stand at room temperature, then the mass washed and distilled. Preferably a polymerization inhibitor for the unsaturated acid is also added.

The dialcohol employed above is best prepared by the alcoholysis of a corresponding diacyloxy compound, e.g. $O[SiR'_2(CH_2)_nOOCCH_3]_2$. The step can be carried out by contacting (preferably at reflux temperature) the diacyloxy compound with an alcohol such as methanol or ethanol in the presence of a basic catalyst such as NaOH or KOH when $n$ is 2, or in the presence of either a basic catalyst or an acid catalyst such as $H_2SO_4$ when $n$ is 3 or 4. The diacyloxy compound where $n$ is 3 or 4 is best prepared by reacting $(R'_2HSi)_2O$ with e.g. allyl acetate or its next higher homologue, the acetate of allylcarbinol (3-buten-1-ol). Typical disiloxanes which can be used in this step are $[(CH_3)_2HSi]_2O$, $[CH_3(C_6H_5)HSi]_2O$, and $[(C_6H_5)_2HSi]_2O$. This reaction can be carried out in the presence of chloroplatinic acid as a catalyst (preferably in amounts of from $1 \times 10^{-6}$ to $1 \times 10^{-4}$ mol per mol of siloxane) at temperatures of e.g. 80° to 180° C. When $n$ in the diacyloxy compound is 2 it is preferable to react $R'_2HSiCl$ with vinyl acetate, using the same catalyst, to produce $R'_2Si(CH_2CH_2OOCCH_3)Cl$. The latter is then hydrolyzed by typical chlorosilane hydrolysis techniques to produce the desired disiloxane.

As noted above, the R' radicals herein are monovalent hydrocarbon radicals free of aliphatic unsaturation. Examples of suitable radicals are alkyl such as methyl, ethyl, propyl, and octadecyl; aryl such as phenyl and xenyl; alkaryl such as tolyl, and aralkyl such as benzyl. Preferably at least two of the R' radicals per molecule are alkyl. The most preferred compounds are those in which R' is methyl or phenyl.

An alternative process for the production of those compounds of this invention in which n is 3 and R' is methyl, ethyl, or phenyl is to react the acrylic or methacrylic acid with a cyclic "silpropoxane" of the formula —SiR'$_2$CH$_2$CH$_2$CH$_2$O— or polymers thereof, followed by equilibration with a hexaorganodisiloxane as described above. The most preferable of such materials is the compound $$(CH_3)_2Si\underset{CH_2—CH_2}{\overset{O}{\diagup\diagdown}}CH_2$$

The "silpropoxanes" and their preparation are disclosed in detail in the copending application of John L. Speier, Serial No. 598,528, filed July 18, 1956, and assigned to the assignee of this invention. In brief, these compounds can be prepared by heating compounds of the type [R'$_2$(HOCH$_2$CH$_2$CH$_2$)Si]$_2$O and removing the evolved water.

Illustrations of suitable hexaorganodisiloxanes which can be employed in the equilibration step herein include $$(CH_3)_3SiOSi(CH_3)_3$$

$$(CH_3)_2C_6H_5SiOSi(C_6H_5)_2CH_3$$

$$(C_6H_5)_2CH_3SiOSiCH_3(C_6H_5)_2$$

and $$(CH_3)_2C_2H_5SiOSi(C_6H_5)_3$$

The compounds of this invention are readily polymerized e.g. by heating them in the presence of peroxy type vinyl polymerization catalysts. Such catalysts are well known, and include benzoyl peroxide, t-butyl perbenzoate, t-butyl peracetate, and the like. The low viscosity of the unpolymerized product gives it utility as an impregnating varnish, potting compound for intricate or difficultly accessible areas, etc. without need for dilution with an organic solvent. The polymerized material is a tough elastic solid.

The compounds of this invention can also be copolymerized with organic vinylic type resins, or can be incorporated into conventional organosiloxanes of the general formula $$R''_xSiO_{\frac{4-x}{2}}$$

referred to above. The latter is accomplished by contacting the two polymers, at elevated temperatures if desired, in the presence of a siloxane rearrangement catalyst such as H$_2$SO$_4$. The resulting copolymer then contains the CH$_2$=CRCOO(CH$_2$)$_n$Si≡ units in its siloxane network, and is thus readily polymerized through the acrylic portion of the molecule. The distillable nature of the inventive compounds makes the isolation of pure material practical, so that the amounts incorporated into other copolymers can be carefully controlled.

The following examples are illustrative only. All parts mentioned are parts by weight.

*Example 1*

A mixture was prepared containing 25 parts (0.1 mol) of O[Si(CH$_3$)$_2$CH$_2$CH$_2$CH$_2$OH]$_2$, 16.4 parts of 96% pure acrylic acid, 1.7 parts hydroquinone (as a polymerization inhibitor), 32.4 parts (0.2 mol) hexamethyldisiloxane, 1.7 parts trifluoroacetic acid, and 1.7 parts sulfuric acid. The resulting clear, homogeneous solution was allowed to stand at room temperature for three days, during which time a small amount of water separated out. The reaction mass was washed with water until neutral, dried over anhydrous Na$_2$SO$_4$, and distilled after an additional 1.5 parts of hydroquinone had been added. The product $$CH_2=CHCOOCH_2CH_2CH_2(CH_3)_2SiOSi(CH_3)_3$$

was obtained, boiling at 105°–107° C./10 mm. Hg, $n_D^{25}$ 1.4222, $d_4^{25}$ 0.901, R$_D$ 0.2821 (calculated value 0.2822).

*Example 2*

The procedure of Example 1 was employed on a mixture containing 50 parts (0.2 mol)

$$O[Si(CH_3)_2CH_2CH_2CH_2OH]_2$$

35.8 parts 96% pure methacrylic acid, 3.4 parts hydroquinone, 64.8 parts hexamethyldisiloxane, 3.4 parts trifluoroacetic acid and 3.4 parts sulfuric acid. The product $$CH_2=C(CH_3)COOCH_2CH_2CH_2(CH_3)_2SiOSi(CH_3)_3$$

was obtained, boiling at 120°–125° C/10 mm. Hg, $n_D^{25}$ 1.4255, $d_4^{25}$ 0.901, R$_D$ 0.2841 (calculated value 0.2841).

*Example 3*

A mixture of 76.4 parts O[Si(CH$_3$)$_2$CH$_2$CH$_2$CH$_2$OH]$_2$, 52.3 parts methacrylic acid, 5 parts hydroquinone, 5 parts sulfuric acid, and 66 parts benzene was heated at reflux temperature for 3 hours. Water was trapped out of the refluxing benzene-water azeotrope during this period. The reaction mass was washed until neutral, dried, and the benzene removed by flash distillation. The residue was heated to 200° C./3 mm. Hg in an attempt to distill a product therefrom, but no distillate was obtained. There was then added 121.5 parts hexamethyldisiloxane, 7 parts trifluoroacetic acid, 7 parts sulfuric acid, and 7 parts hydroquinone to the above residue. The mixture was allowed to stand 3 days at room temperature, and was then washed free of water, dried, and distilled. The same product as in Example 2 was obtained, and it was found to have a saponification equivalent of 270 as compared to the calculated value of 274.

*Example 4*

The procedure of the first step of Example 3 was repeated, except that acrylic acid was employed rather than methacrylic. Again it was found that no distillable product was obtained at temperatures up to about 200° C./3 mm. Hg. The material was then equilibrated with hexamethyldisiloxane as in the second step of Example 3, and the acryloxypropyl substituted product of Example 1 was obtained by distillation.

*Example 5*

When the procedure of Example 2 is followed, but using O[Si(CH$_3$)(C$_6$H$_5$)CH$_2$CH$_2$CH$_2$OH]$_2$ as the dialcohol and C$_6$H$_5$(CH$_3$)$_2$SiOSi(CH$_3$)$_2$C$_6$H$_5$ as the hexaorganodisiloxane, the product obtained has the formula $$CH_2=C(CH_3)COOCH_2CH_2CH_2(CH_3)$$
$$(C_6H_5)SiOSi(CH_3)_2C_6H_5$$

When the dialcohol is O[Si(CH$_3$)$_2$CH$_2$CH$_2$OH]$_2$ and the hexaorganodisiloxane is hexamethyldisiloxane, the product is CH$_2$=C(CH$_3$)COOCH$_2$CH$_2$(CH$_3$)$_2$SiOSi(CH$_3$)$_3$; and if O[Si(CH$_3$)$_2$CH$_2$CH$_2$CH$_2$CH$_2$OH]$_2$ is used the product is $$CH_2=C(CH_3)COOCH_2CH_2CH_2CH_2(CH_3)_2SiOSi(CH_3)_3$$

*Example 6*

The products of Examples 1 and 2 were individually mixed with 0.1% by weight of α,α'-azo-diiso-butyronitrile and heated at 100° C. Each formed an elastic solid polymer.

That which is claimed is:

1. A process for the preparation of compounds of the formula CH$_2$=CRCOO(CH$_2$)$_n$SiR'$_2$OSiR''$_3$, where each R' and each R'' is a monovalent hydrocarbon radical free of aliphatic unsaturation, R is selected from the group consisting of hydrogen and a methyl radical, and n is an integer of from 2 to 4 inclusive, which comprises reacting a disiloxane of the formula O[SiR'$_2$(CH$_2$)$_n$OH]$_2$, where each R' and n are as above defined, by contacting said disiloxane in a liquid phase with an acid selected from the group consisting of acrylic and methacrylic acid, and reacting the reaction mass therefrom by contacting said mass in a liquid phase with a disiloxane of the formula $(R''_3Si)_2O$, where each $R''$ is as above defined, in the presence of from 1 to 5 inclusive percent by weight based on the weight of the total siloxanes in the system, of an acidic organosiloxane rearrangement catalyst.

2. A process for the preparation of compounds of the formula $CH_2=CRCOO(CH_2)_nSiR'_2OSiR''_3$, where each $R'$ and each $R''$ is a monovalent hydrocarbon radical free of aliphatic unsaturation, R is selected from the group consisting of hydrogen and a methyl radical, and $n$ is an integer of from 2 to 4 inclusive, which comprises contacting in a liquid phase a disiloxane of the formula $O[SiR'_2(CH_2)_nOH]_2$, where each $R'$ and $n$ are as above defined, an acid selected from the group consisting of acrylic and methacrylic acid, and a disiloxane of the formula $(R''_3Si)_2O$ where each $R''$ is as above defined, in the presence of from 1 to 5 inclusive percent by weight of an acidic organosiloxane rearrangement catalyst based on the weight of the total siloxanes in the system.

3. A process for the production of a compound of the formula

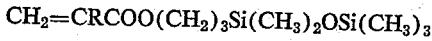

where R is selected from the group consisting of hydrogen and a methyl radical, which comprises contacting a disiloxane of the formula $O[Si(CH_3)_2CH_2CH_2CH_2OH]_2$, an acid selected from the group consisting of acrylic and methacrylic acid, and hexamethyldisiloxane, in a liquid phase and in the presence of from 1 to 5 inclusive percent by weight of concentrated sulfuric acid catalyst based on the weight of the total siloxanes present.

4. A process for the production of a compound of the formula $CH_2=CRCOO(CH_2)_3Si(CH_3)_2OSi(CH_3)_3$, where R is selected from the group consisting of hydrogen and a methyl radical, which comprises contacting in a liquid phase a disiloxane of the formula

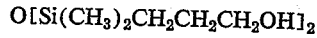

with an acid selected from the group consisting of acrylic and methacrylic acid, and contacting the reaction mass thereof with hexamethyldisiloxane in a liquid phase and in the presence of from 1 to 5 inclusive percent by weight of concentrated sulfuric acid catalyst based on the weight of the total siloxanes.

5. The method which comprises contacting a disiloxane of the formula $O[Si(CH_3)_2CH_2CH_2CH_2OH]_2$, methacrylic acid, and hexamethyldisiloxane, in a liquid phase and in the presence of from 1 to 5 inclusive percent by weight of concentrated sulfuric acid catalyst based on the weight of the total siloxanes; removing said acid catalyst from the reaction mass; and separating the product $CH_2=CMeCOO(CH_2)_3Si(CH_3)_2OSi(CH_3)_3$ where Me represents a methyl radical.

6. The method which comprises contacting in a liquid phase a disiloxane of the formula $O[SiR'_2(CH_2)_nOH]_2$, where each $R'$ is a monovalent hydrocarbon radical free of aliphatic unsaturation and $n$ is an integer of from 2 to 4 inclusive, with an acid selected from the group consisting of acrylic and methacrylic acid; contacting the reaction mass thereof with a disiloxane of the formula $(R''_3Si)_2O$ in a liquid phase and in the presence of from 1 to 5 inclusive percent by weight of an acidic organosiloxane rearrangement catalyst based on the weight of the siloxanes in the system, each $R''$ being a monovalent hydrocarbon radical free of aliphatic unsaturation; removing the acid catalyst from the reaction mass and distilling off the product

where $n$, $R'$, and $R''$ are as above defined and R is selected from the group consisting of hydrogen and a methyl radical.

7. The method which comprises contacting a disiloxane of the formula $O[Si(CH_3)_2CH_2CH_2CH_2OH]_2$, an acid selected from the group consisting of acrylic and methacrylic acid, and hexamethyldisiloxane, in a liquid phase and in the presence of from 1 to 5 inclusive percent by weight of concentrated sulfuric acid catalyst based on the weight of the total siloxanes; removing said acid catalyst from the reaction mass; and distilling off the product $CH_2=CRCOO(CH_2)_3Si(CH_3)_2OSi(CH_3)_3$ where R is selected from the group consisting of hydrogen and a methyl radical.

References Cited in the file of this patent

UNITED STATES PATENTS

| | | |
|---|---|---|
| 2,770,633 | Sommer | Nov. 13, 1956 |
| 2,793,223 | Merker | May 21, 1957 |
| 2,823,218 | Speier et al. | Feb. 11, 1958 |